(12) United States Patent
Laporte et al.

(10) Patent No.: US 9,755,938 B1
(45) Date of Patent: Sep. 5, 2017

(54) MONITORED SYSTEM EVENT PROCESSING AND IMPACT CORRELATION

(71) Applicant: EMC Corporation, Hopkinton, MA (US)

(72) Inventors: Russell Laporte, Webster, MA (US); Daniel Collins, Princeton, MA (US); Ankita Pawar, Raleigh, NC (US); Jun Liang, Worcester, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 387 days.

(21) Appl. No.: 13/721,905

(22) Filed: Dec. 20, 2012

(51) Int. Cl.
*G06F 15/16* (2006.01)
*H04L 12/26* (2006.01)

(52) U.S. Cl.
CPC .................... *H04L 43/10* (2013.01)

(58) Field of Classification Search
CPC ...................................... H04L 43/10
USPC ........................ 709/224, 227, 219
See application file for complete search history.

(56) References Cited

U.S. PATENT DOCUMENTS

| | | | |
|---|---|---|---|
| 8,166,061 B2* | 4/2012 | Armstrong et al. | 707/769 |
| 2004/0193969 A1* | 9/2004 | Nemoto et al. | 714/100 |
| 2008/0007568 A1* | 1/2008 | Chou | G06T 19/00 345/629 |
| 2008/0058961 A1* | 3/2008 | Biberdorf | G06F 11/0709 700/5 |
| 2008/0178185 A1* | 7/2008 | Okada et al. | 718/103 |
| 2008/0270596 A1* | 10/2008 | Wahl | 709/224 |
| 2011/0082856 A1* | 4/2011 | Subbiah et al. | 707/718 |
| 2011/0246651 A1* | 10/2011 | Djabarov | G06F 11/3495 709/224 |
| 2012/0023092 A1* | 1/2012 | Egan et al. | 707/718 |
| 2012/0109958 A1* | 5/2012 | Thakur et al. | 707/737 |
| 2013/0232382 A1* | 9/2013 | Jain et al. | 714/48 |
| 2013/0304530 A1* | 11/2013 | Chodavarapu | G06Q 10/0639 705/7.11 |
| 2014/0115001 A1* | 4/2014 | Arroyo et al. | 707/772 |
| 2015/0058844 A1* | 2/2015 | Conklin | G06F 9/45558 718/1 |

* cited by examiner

*Primary Examiner* — Bryan Lee
*Assistant Examiner* — Oluwatosin Gidado
(74) *Attorney, Agent, or Firm* — BainwoodHuang

(57) ABSTRACT

The subject disclosure is directed towards providing a user with impact-related information regarding the impact of a monitored event (for a detected resource issue) to a managed system, such as a storage system. An event is generated when a resource such as a hard disk has an issue, e.g., has failed. Information from the event is automatically extracted and used to communicate with a management program coupled to the resource. Communication with the management program obtains information as to the impact the resource issue has to the system, e.g., what servers and/or applications are impacted. The impact-related data may be presented in a report to a user.

20 Claims, 6 Drawing Sheets

| Serial Number 341 | IP Address 342 | Port 343 | Username 344 | Password 345 | Scope 346 | Namespace 347 |
|---|---|---|---|---|---|---|
| | | | | | | |
| | | | | | | |
| | | ... | | | | |
| | | | | | | |

Table 330

MONITORED SYSTEM EVENT PROCESSING AND IMPACT CORRELATION

BACKGROUND

In contemporary network systems such as network storage systems, a system issue, such as a problem with a monitored resource (e.g., a hard disk component), is typically identified via a system logging mechanism. In general, an event monitor notifies a targeted audience (one or more users, referred to hereinafter as simply a "user") of a detected problem with a system resource, typically by sending an email message. The user needs to receive and read the email to recognize that there is an issue. The user needs to be reasonably skilled to interpret the message, because the log information is exposed to the user basically verbatim, and contains only low-level system information.

More particularly, a user responsible for the system reads the log information to determine that there is an issue with a resource. Then, once recognized by a user, the user needs to manually correlate the part of the system that is directly affected by the event (e.g., a lost connection between a storage system and an attached server) to determine the impact of the event, and decide a level of urgency to apply to addressing the issue. For example, the message may indicate that a hard disk is not functioning properly, whereby the user then needs to determine how serious the problem is.

Currently, a user accomplishes this by manually running a number of queries to the network (e.g., storage) system to determine how the system resource is being used and by what entity or entities, and then decides what further steps to take and when to take them. For example, if the disk is not being used by any important applications and it is night time, then any corrective action may wait until the next morning. Conversely, if the disk is being used by a server running an important application such as payroll, the corrective action may need to be taken immediately. This manual approach is both time consuming and potentially error prone.

BRIEF DESCRIPTION OF THE DRAWINGS

The present invention is illustrated by way of example and not limited in the accompanying figures in which like reference numerals indicate similar elements and in which:

FIG. 3 is a representation of database records and fields that provide information used to obtain additional information for an impact report, according to one example embodiment.

DETAILED DESCRIPTION

Various aspects of the technology described herein are generally directed towards automatically processing the low-level system information that may be generated from any source (usually log messages) by an event monitor and effectively use the information to generate a comprehensive impact (e.g., usage) report. To this end, a program or the like automatically handles obtaining additional information regarding low-level system stability events, such that a user notified of an event can quickly determine the impact and risk involved with the event, without having to address the underlying issue directly. By having this information available, the user may plan any corrective action in accordance with the impact/risk determination.

It should be understood that any of the examples herein are non-limiting. For instance, one example used herein is related to processing an event detected on a hard disk, however any system resource that may be monitored and for which additional information may be obtained (particularly by an automated process) may be used with the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and system maintenance in general.

Figure 1:
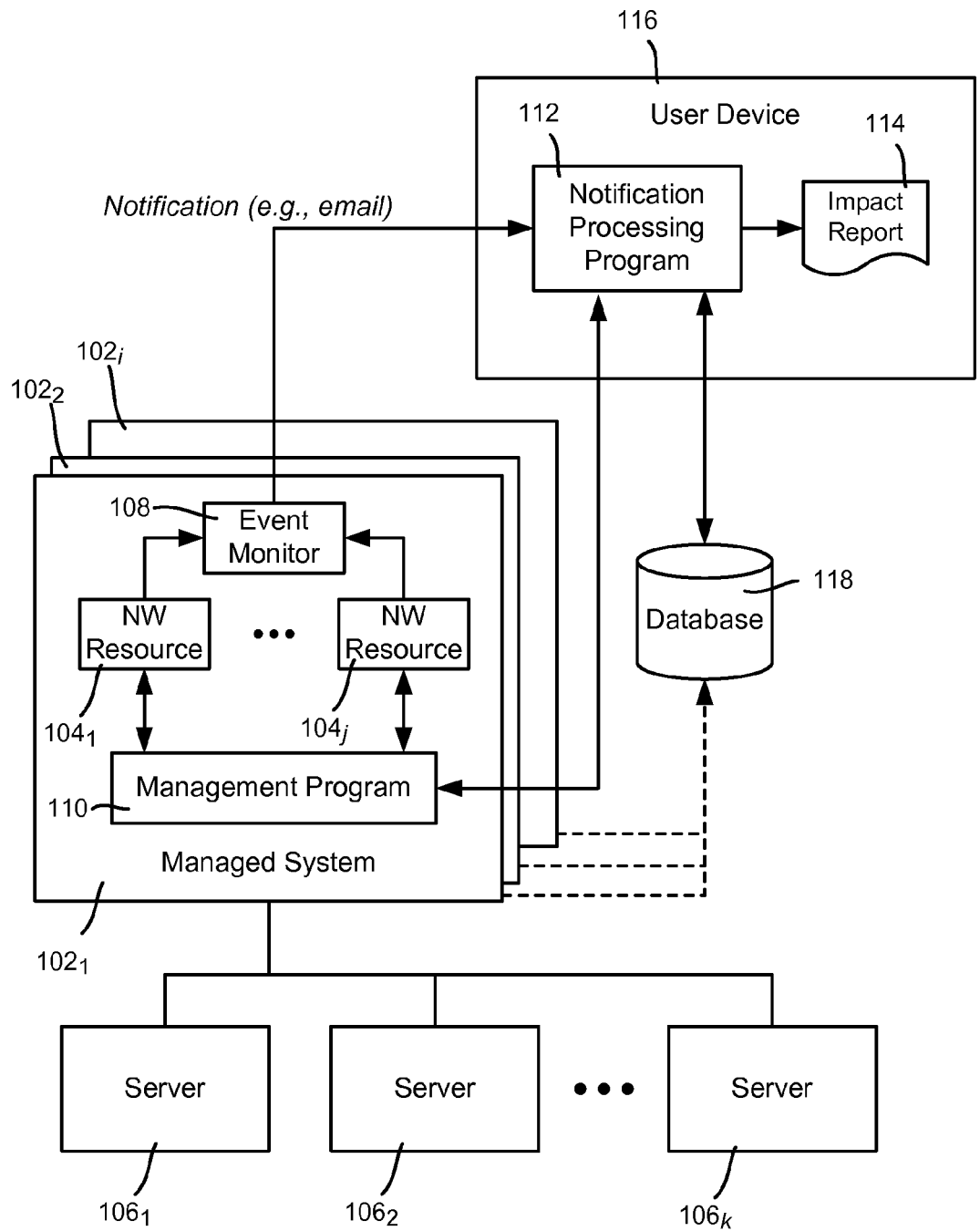
FIG. 1 is a block diagram showing various example components that may be used to produce an impact report based upon a resource event according to one example embodiment.

FIG. 1 shows a managed system $102_1$ (shown as one of possibly many such managed systems $102_1$-$102_i$) such as a network storage system having a plurality of network resources $104_1$-$104_j$. For purposes of brevity, only the managed system $102_1$ will be referenced with FIG. 1 hereinafter, although it is understood that other managed systems may operate in the same or a similar way with respect to the technology described herein.

In the example of FIG. 1, the managed system $102_1$ is coupled to a plurality of servers $106_1$-$106_k$ that use the managed system's resources $104_1$-$104_j$. As can be readily appreciated, other (e.g., non-server) machines or the like may use the resources $104_1$-$104_j$ of the managed system $102_1$.

To detect any issues with the resources $104_1$-$104_j$, an event monitor 108 proactively probes the resources $104_1$-$104_j$ in one implementation. Events may be generated from any system resource, and may be of any type. For example, for an issue detected with a hard disk drive, an event may be triggered by a hard disk failure, a lost connection to a server, and so forth. Proactive warnings and the like based upon threshold values may also trigger events in some implementations, e.g., capacity thresholds to indicate that hard disk space/LUN space/pooled disk space is running low, performance measurements versus thresholds that indicate a potential problem (e.g., an application is running slow), disk errors are becoming more frequent, and so forth.

When an issue is detected that triggers an event, the event monitor (or an intermediary) sends a notification to a user, such as by email, of each event for which the user is responsible for resolving. Described herein is automated processing of the log message based upon certain information therein, which is then used to obtain additional information that is useful to a user but heretofore was only manually discoverable by a skilled user by appropriately querying a management program 110.

As shown in FIG. 1, a notification processing program 112 uses the notification data to generate an impact report 114. The notification processing program 112 is shown as running on a user device 116. In the example implementation of FIG. 2, (in which like numerals to those of FIG. 1 are shown as 2xx instead of 1xx, and only one managed system 202 is shown), an impact report generation program 213 is built into the managed system 202 to generate an impact report 214. As can be readily appreciated, the location of the program that generates the report is not significant, except to note that the event monitor 208 need not be responsible for sending a notification in the form of a formatted email message in the example implementation of FIG. 2, but rather only need provide the event/log to the impact report generation program 213. Further, the impact generation program 213 need not connect remotely to the management program 210, and thus does not need remote access information (e.g., address, port and security-related data) as described below.

Figure 2:
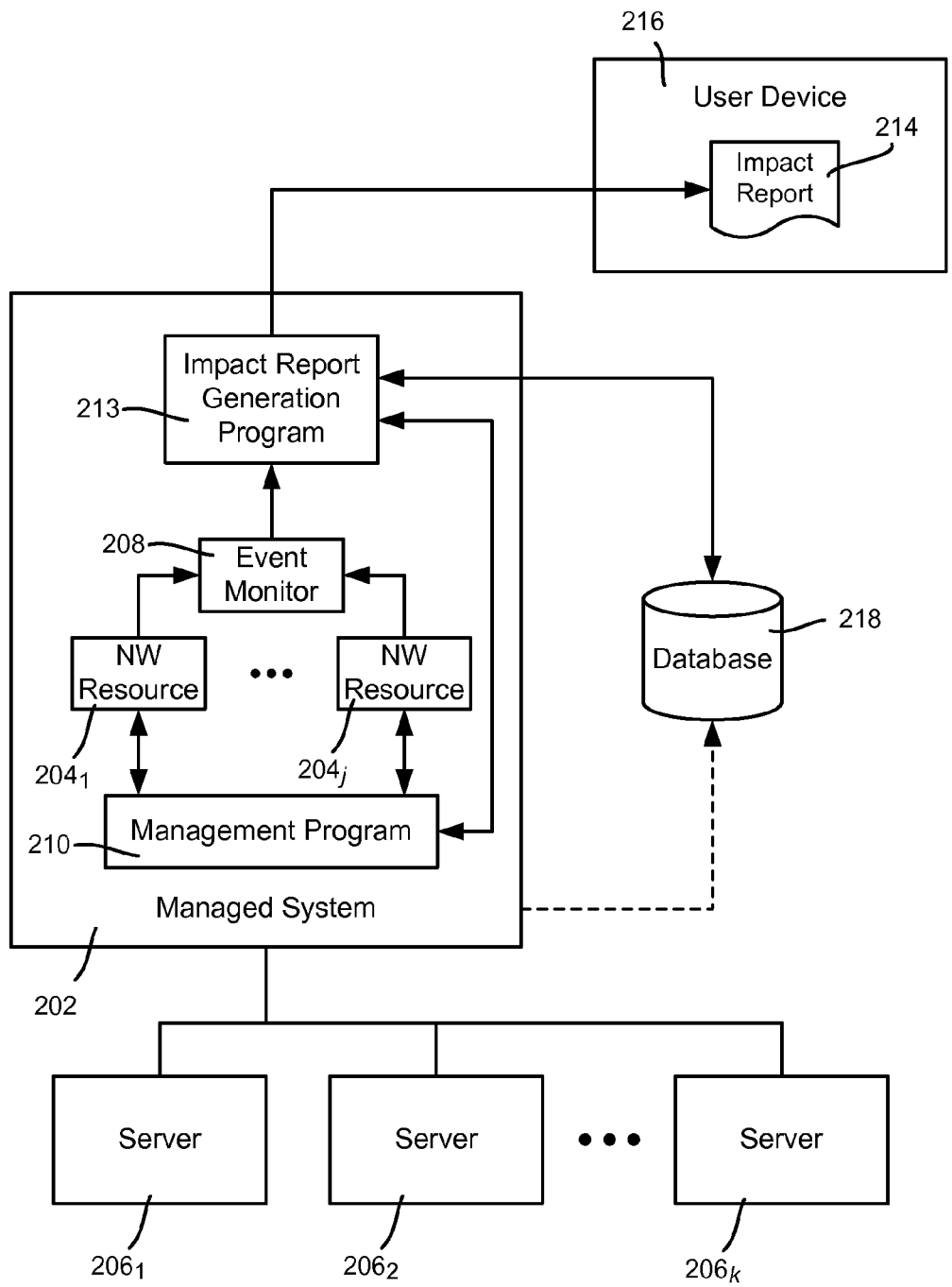
FIG. 2 is a block diagram showing various example components, in an alternative implementation, which may be used to produce an impact report based upon a resource event according to one example embodiment.

One piece of information that the event monitor 108 or 208 outputs is the serial number (or other unique identifier) of the resource for which an event was detected. This identification number (or a hash value thereof) may be used as a key to a database table, maintained on a database 118 (FIG. 1), 218 (FIG. 2). For example, there may be one table for each managed system, and the serial number may be used to determine to which system the resource (associated with the event) is coupled. Alternatively, there may be one table, with one record for each system, (although as described below having a record per resource provides more granularity if desired).

In general, the event contains enough information (a key) to obtain additional information, which in turn is used to obtain even more information, generally acting as a kind of bootstrap-type model. As shown in FIG. 3, the unique identifier may be used as a key to find a table 330 and/or record (e.g., 331₂) corresponding to the resource. The record contains relevant information for the system (and possibly the resource), including information needed to communicate with the management program 110 (FIG. 1). As shown in FIG. 3, example fields 341-347 include Serial Number, IP Address, Port, Username, Password, Scope and Namespace fields, respectively. The Serial Number may be used as the key for searching for a particular table and record. The IP Address and Port values allow for a network connection to be made, while the Username, Password, and Scope values allow for a credential object to be created that satisfies the management program's security requirements. Note that the credential object may be for user authentication, or to authenticate the program 112. In a Common Information Model-type management program, the namespace value is to designate which CIM namespace is being targeted with requests for management.

Note that if the information maintained in a table is the same for all resources of a managed server, then a less granular key may be used, e.g., the event monitor may use a unique identifier corresponding to the managed system rather than the resource serial number identifier. However, the resource does need to be identified, and accessing more granular information may be desirable, and thus the resource serial number identifier serves as a useful key in one implementation.

Indeed, other fields are feasible. For example, specific information regarding the resource may be maintained as well, e.g., a disk may have fields containing data corresponding to manufacturer, type, capacity, speed, age, and so forth, which may be used to help indicate what the issue may be. If REST APIs or the like are used instead of CIM, or another communication protocol, data in a field may indicate how communication is to be performed (although trial and error instead may be used). In a managed system having multiple types of monitored resources, such as a server in which hard disks, applications and other resources may be monitored, the type of resource may be indicated in a field.

Note that the fields may be updated whenever a change is made to a managed system, e.g., a new IP address assigned, a hard disk replaced, and so forth, as indicated by the dashed lines to the databases 118 (FIG. 1) and 218 (FIG. 2). This may be automated so that the database does not contain stale data.

Once the system event is associated with the data needed to communicate with the management program, a set of automated queries may be made to the management program. For example, one type of information that the management program may return is whether a disk having an issue is part of (logically wrapped into) a logical unit (LUN), and which server or servers are using the disk (e.g., the LUN). Note that this information is already available from a management program given the proper queries. The returned usage information is processed to produce an impact report or the like that informs the user about the potential risk that the event presents to the data processing environment into which the system is linked.

Figure 4:
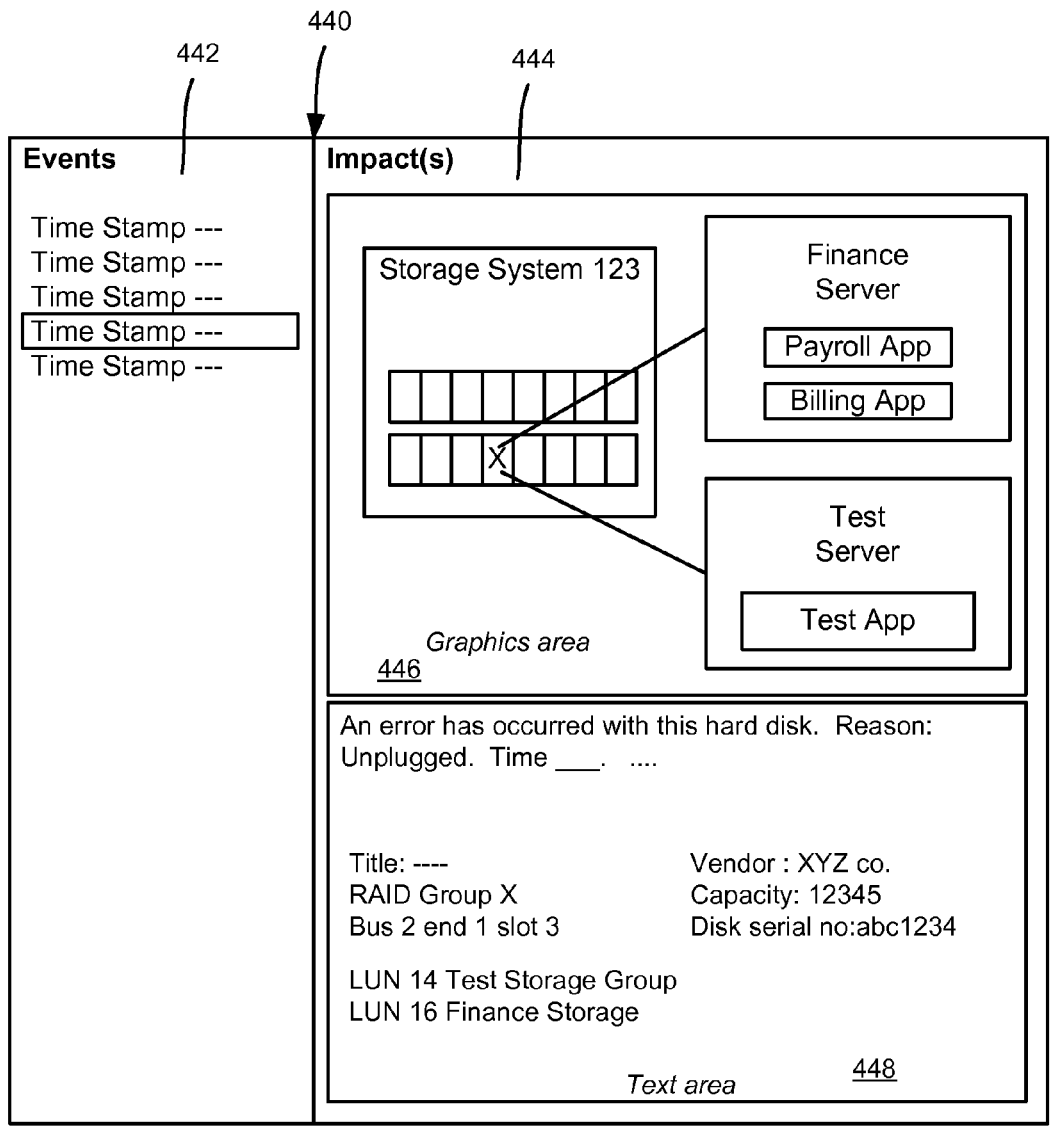
FIG. 4 is a representation of how an impact report may be presented in a graphical user interface, according to one example embodiment.

FIG. 4 is an example user interface 440 showing how an impact report may roll up the various information and convey that information to a user in a straightforward "at-a-glance" way. In the example of FIG. 4, the received events are shown in one area 442, with which the user may interact to select one, e.g., via touch, moving a pointer to highlight one, and so forth.

Once selected, data related to the selected event, e.g., queried from the managed system's management program, may be used to populate an impact area 444 of the user interface 442. In the example of FIG. 4, a graphical user interface area (GUI) 446 may provide graphics, animations, a live camera feed and so forth in the impact area 444. Text also may be provided in a text area 448 of the impact area 444. As can be seen, the user automatically receives pertinent information regarding the resource that has an issue and its potential impact on whichever entities may be using that resource. The user may then make a decision on a remedial action, as well as when the action needs to be taken.

Note that some of the returned information in the impact report may be used for further lookups, either by manual action or an automatic process. For example, a server name may be returned, which the user or an automated process may extract and use to obtain further information regarding the importance of that server, its current status such as what application or applications are running, and so forth. To assist the user, some or all of the elements displayed in the impact area may be interactive, e.g., pressing or selecting the displayed "finance server" element may send a query to the finance server or another entity to determine its current status.

Figure 5:
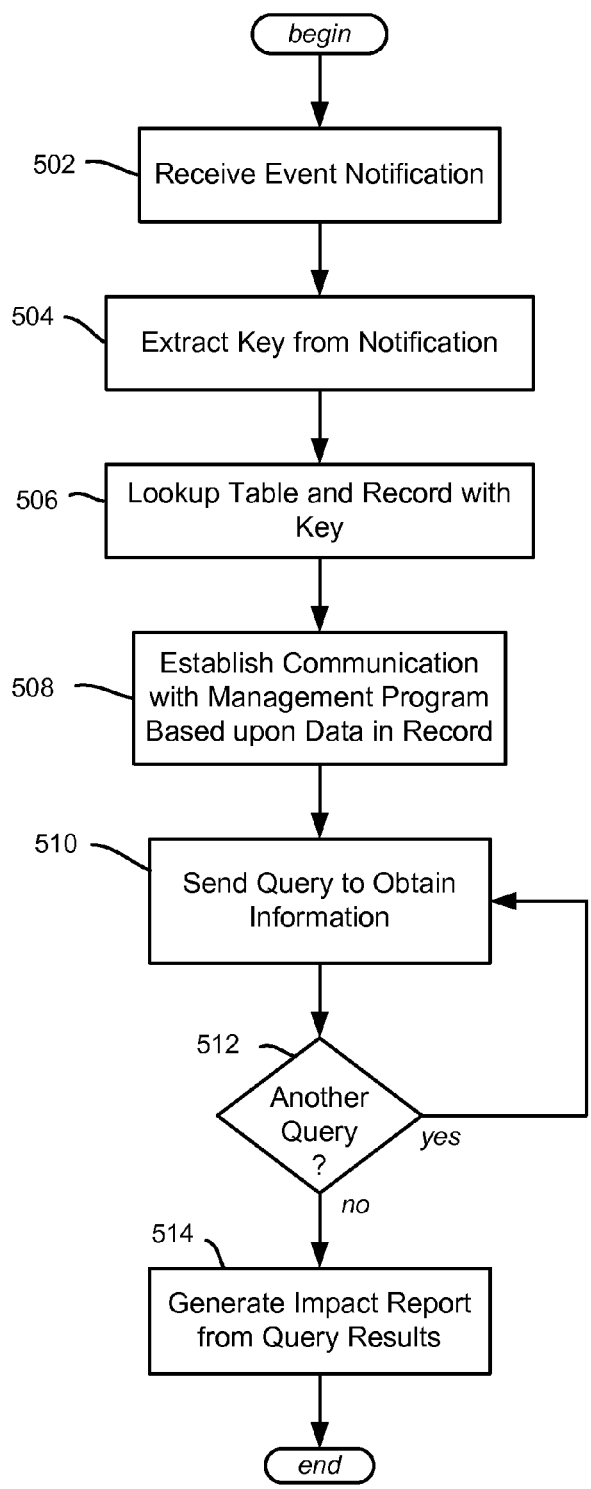
FIG. 5 is a flow diagram showing example steps that may be taken to obtain information for producing an impact report for an event, according to one example embodiment.

FIG. 5 is a flow diagram showing example steps taken to automatically process an event notification into an impact report in one example implementation, beginning at step 502 which represents receiving the event notification. Step 504 extracts the key (e.g., resource serial number) from the notification, such as by a simple text search of the message content, or by knowing a consistent location where the event monitor places this information. Note that step 504 may wait for some user interaction before acting, e.g., the user may need to first select the corresponding event via the user interface (e.g., 440, FIG. 4) before the next steps are taken.

Step 506 represents accessing the database to find the table and record corresponding to the key. As described above, the record contents allow for establishing communication with the management program, including authentication, which occurs at step 508. Note that errors such as the inability to establish communication may be handled in a conventional manner, and are not described herein for purposes of brevity.

Once communication is established, steps 510 and 512 represent querying the management software for the desired information, essentially following the rule-based line of querying already performed mentally by skilled users. The querying may be a sequence of queries that are always the same, and/or may be dependent on certain responses. For example, a query may determine whether a disk is part of a LUN; the response may be used to select a different line of querying depending on whether the answer was yes (e.g., a LUN identifier) or no.

When the queries have obtained the needed information, step 514 generates the impact report. As can be seen, in this way the act of gathering the relevant usage data for the resource is done automatically, based on up-to-date information. This speeds up and simplifies the process of determining a priority for addressing the issue, as well as significantly reducing the chance of human error that otherwise may adversely affect the remedial process.

Example Computing Device

The techniques described herein can be applied to any device or set of devices capable of running programs and processes, such as the user device 116 of FIG. 1. It can be understood, therefore, that handheld, portable and other computing devices and computing objects of all kinds including cell phones, tablet/slate computers and the like are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
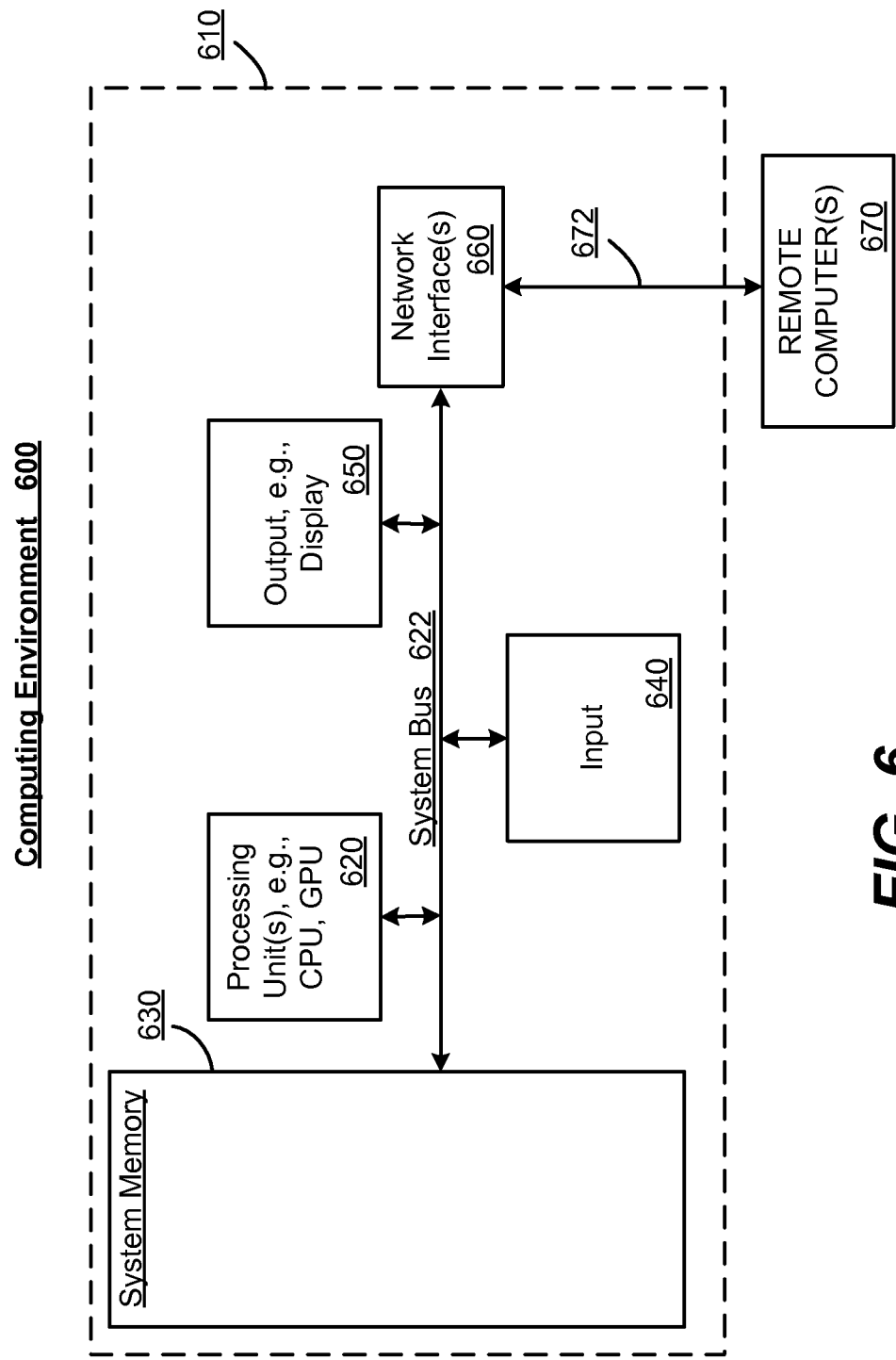
FIG. 6 is a block diagram representing an example computing environment into which aspects of the subject matter described herein may be incorporated.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the example computing system environment 600.

With reference to FIG. 6, an example device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer-readable media and can be any available media that can be accessed by computer 610. The system memory 630 may include computer storage media in the form of volatile and/or nonvolatile memory such as read only memory (ROM) and/or random access memory (RAM), and hard drive media, optical storage media, flash media, and so forth. By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such as a local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method comprising:
   receiving an event notification in response to an event associated with a monitored system resource, the received event notification comprising event-related data;
   processing the event-related data, by a notification processing program associated with a user device, to obtain a key to additional information associated with the monitored system resource, the key comprising a unique identifier associated with the monitored system resource;
   accessing a database associated with the monitored system resource using the key to obtain the additional information;
   using at least part of the additional information for establishing communication with a management program coupled to the monitored system resource via a network connection, wherein the user device is connected remotely to the management program via the network connection;
   querying the management program, by the user device, using a generated set of automated queries to obtain query results from the management program, the obtained query results comprising management data related to the monitored system resource, the management data identifying one or more entities that use the monitored system resource;
   generating, by the notification processing program, an interactive impact report from the obtained query results, the interactive impact report including impact-related data associated with the event, the interactive impact report including data identifying the monitored system resource, data identifying the one or more entities using the monitored system resource, and information regarding a potential impact of the event on the one or more entities; and
   outputting the interactive impact report to a user interface of the user device to automatically inform the user of the potential impact of the event to the monitored system, the interactive impact report comprising one or more interactive elements.

2. The method of claim 1, wherein processing the event-related data comprises extracting the key from the event notification message, and further comprising:
   automatically extracting a server name from the interactive impact report; and
   obtaining further information regarding the server, by an automated process, the further information identifying a current status of the server and applications running on the server.

3. The method of claim 1, wherein the unique identifier associated with the key comprises a serial number of the monitored system resource, and further comprising:
   accessing a database record associated with the database; and
   updating one or more fields in the database record in response to a change associated with the monitored system resource.

4. The method of claim 3, wherein the database record includes an IP address and a port associated with the management program, and using at least part of the additional information for establishing communication comprises communicating with the management program via the IP address and the port.

5. The method of claim 1, further comprising:
presenting the interactive impact report within the user interface, wherein the interactive impact report comprises an events area and an impact area, wherein received events are displayed within the events area, wherein a user interacts with the events area to select an event; and
populating the impact area with data related to a selected event from the received events.

6. The method of claim 3, wherein the database record includes security-related information, and wherein using at least part of the additional information for establishing communication comprises providing a credential based upon the security-related information to the management program.

7. The method of claim 1, wherein the monitored system resource is a resource on a network storage system, the network storage system comprising a plurality of networked resources, wherein an event is triggered based on a capacity threshold for the monitored system resource indicating disk space is running low, the capacity threshold comprising a disk space threshold, a logical unit (LUN) space threshold, or a pool disk space threshold.

8. The method of claim 1, wherein the user interface is a graphical user interface, and wherein outputting the interactive impact report comprises presenting at least part of the impact-related data on the graphical user interface, wherein the graphical user interface is configured to receive input from a user associated with the user device, generate a query based on the received input, and transmit the generated query to the monitored system resource, wherein the received input comprises a selection of an interactive element within the one or more interactive elements associated with the interactive impact report.

9. In a computing environment, a system comprising:
one or more processors; and
a report generation program implemented on the one or more processors, the report generation program configured to generate an interactive impact report from query results associated with a set of automated queries, the interactive impact report comprising one or more interactive elements, the interactive impact report further comprising impact-related data corresponding to an event associated with a storage system resource generated by an event monitor that monitors the storage system resource of the managed system, the report generation program configured to receive an event notification associated with an event indicating the storage system resource has a detected issue, extract a key from the received event notification, accessing a database to associated with the storage system resource using the key to obtain data to establish communication with a management program coupled to the storage system resource, generate the set of automated queries, and query the management program using the generated set of automated queries to obtain query results comprising management data related to the storage system resource, the management data identifying one or more entities using the storage system resource and information regarding a potential impact of the event on the one or more entities, generate the interactive impact report using the obtained query results, and output the interactive impact report to a graphical user interface, the interactive impact report comprising the impact-related data and the one or more interactive elements.

10. The system of claim 9, wherein the report generation program is run on an external computing device, and wherein one or more fields in the database is automatically updated in response to a change in the storage system resource.

11. The system of claim 9, wherein the event monitor outputs the event in association with the unique identifier used by the report generation program as the key to find a record in the database, wherein the one or more interactive elements include a displayed server element, and wherein selecting the displayed server element within the interactive impact report sends a query to the server to determine a current status of the server.

12. The system of claim 9, wherein the data to establish communication with the management program comprises IP address data and port data.

13. The system of claim 9, wherein the data to establish communication with the management program comprises a username, password and scope data for authentication.

14. The system of claim 9, wherein the storage system resource comprises a hard disk drive, and wherein the event generated by the event monitor indicates a hard disk drive malfunction, and wherein the management data indicates whether the hard disk drive is part of a logical unit.

15. The system of claim 9, wherein the interactive impact report is output to the graphical user interface configured to receive a selected event from a user, generate a further lookup query for further information associated with the selected event, and transmit the generated query to the storage system resource to obtain the further information associated with the selected event.

16. One or more computer storage devices having computer-executable instructions, which upon execution perform operations, comprising:
receiving an event notification in response to an event, the received event notification indicating that a managed resource has a detected issue;
extracting a key from the received event notification, by an event monitor, the key comprising a unique identifier of the managed resource;
accessing a database table associated with the managed resource with the key to obtain data for communicating with a management program coupled to the managed resource;
establishing communication with the management program;
generating a set of automated queries for obtaining impact-related information from the management program;
querying the management program using the generated set of automated queries to obtain query results, the query results comprising the impact-related information from the management program;
generating an interactive impact report from the obtained query results, the interactive impact report comprising the impact-related information associated with the event, the interactive report including data identifying the managed resource, data identifying the one or more entities using the managed resource or attempting to use the managed resource, and information regarding a potential impact of the event on the one or more entities; and
outputting the interactive impact report to a user device, the interactive impact report further comprising one or more interactive elements, selection of an interactive element sends a query for additional information associated with the managed resource.

17. The one or more computer storage devices of claim 16, having further computer-executable instructions, which upon execution perform operations, comprising, presenting the interactive impact report within a user interface of the user device and populating an impact area with data related to a selected event from received events, wherein the user interface comprises an events area and the impact area, wherein the received events are displayed within the events area.

18. The one or more computer storage devices of claim 16, which upon execution perform operations, comprising, using an IP address, port and security-related information obtained from the database.

19. The method of claim 1, wherein generating a set of automated queries comprises generating the set of automated queries based on a rule-based line of querying, wherein selection of an interactive server element of the one or more interactive elements sends a query to a server to determine a current status of the server.

20. The method of claim 1, wherein generating a set of automated queries comprises generating a first query based on a response associated with a second query.

\* \* \* \* \*